United States Patent [19]

Meadows

[11] Patent Number: 4,801,014
[45] Date of Patent: Jan. 31, 1989

[54] BOUQUET SLEEVE

[76] Inventor: Patricia H. Meadows, 593 California Way, Redwood City, Calif. 94062

[21] Appl. No.: 923,848

[22] Filed: Oct. 28, 1986

[51] Int. Cl.⁴ .............................................. B65D 85/50
[52] U.S. Cl. .................................... 206/423; 47/41 R; 229/87 P; 383/905
[58] Field of Search ...................... 206/423; 229/87 P; 47/41 R, 84; 383/905

[56] References Cited

U.S. PATENT DOCUMENTS

| | | |
|---|---|---|
| 1,044,260 | 11/1912 | Schloss . |
| 1,270,554 | 6/1918 | Rubel . |
| 1,446,563 | 2/1923 | Hughes . |
| 1,541,923 | 6/1925 | Cunningham ...................... 47/41 X |
| 1,610,652 | 12/1926 | Bouchard . |
| 2,039,986 | 5/1936 | Gardner . |
| 2,097,929 | 11/1937 | Lovett . |
| 2,293,531 | 8/1942 | Brooks . |
| 2,774,187 | 12/1956 | Smithers .......................... 206/423 X |
| 3,376,666 | 4/1968 | Leonard ............................ 206/423 X |
| 3,556,389 | 1/1971 | Gregoire ........................ 229/87 P X |
| 3,657,840 | 4/1972 | Benoist ............................ 206/423 X |
| 3,973,356 | 8/1976 | Schacht ........................... 206/423 X |
| 4,216,620 | 8/1980 | Weder et al. . |
| 4,333,267 | 6/1982 | Witte . |
| 4,508,223 | 4/1985 | Catrambone ........................ 206/423 |

FOREIGN PATENT DOCUMENTS

| | | | |
|---|---|---|---|
| 2027851 | 12/1971 | Fed. Rep. of Germany ......... 47/84 |
| 2059304 | 6/1972 | Fed. Rep. of Germany ......... 47/41 |
| 1157678 | 12/1957 | France .................................. 47/41 |
| 1432770 | 2/1966 | France ................................ 206/423 |

Primary Examiner—Stephen Marcus
Attorney, Agent, or Firm—Cushman, Darby & Cushman

[57] ABSTRACT

A prefabricated wrapper for a bouquet of flowers is provided having a decorative crush-to-hold intermediate portion. The bouquet wrapper has a generally conical shape with a lower portion formed as a cup for receipt of flower stems. An upper portion is open for receipt of flowers. The intermediate portion is formed of a metal foil or the like, and is positioned between the upper and lower portions of the wrapper, as a laminate on the upper and lower portions formed unitarily, or as an intermediate portion attached at its margins to upper and lower portions. The wrapper is made of flexible material so that when the intermediate portion is crushed around the stems of flowers, the flowers are held in a gathered position. A disk-shaped portion may be fastened to the upper end of the wrapper to further secure a bouquet of flowers within the wrapper.

1 Claim, 2 Drawing Sheets

BOUQUET SLEEVE

BACKGROUND OF THE INVENTION

When a bouquet of cut flowers is purchased at a floral shop or stand, the form in which they are usually presented to the purchaser by the seller is with a conical over-wrap of paper, with the apex or tip folded up and fastened, e.g. with a staple. Sometimes a peak at the flared top end of the wrap is folded over the flower heads and also secured in place, e.g. by tucking or stapling.

There are clearly some advantages to this manner of presentation, ones which no doubt have contributed to its prevalence. It is inexpensive, the wrapping material is easy to obtain and to store, and sometimes the bouquets can be wrapped ahead of time and the wrap tips kept immersed in water so that the time needed to execute a sale and delivery is kept to a minimum. But there are drawbacks also. One is that the wrapped package is so plain for such attractive contents. Another is that the all-paper cones tend to be leaky at the bottom. A third is that, unless the top is folded over and/or the paper is stapled through some of the flower stems, there is a tendency for the bouquet to fall out of the paper cone unless the paper cone is maintained in an upright condition. Additionally, the bouquet tends to separate within the wrap unless the wrap is wrapped tightly enough. This, however, tends to crush the flowers. Of particular importance is that such a wrap requires the presence of a seller to wrap the bouquet selected by the purchaser. No doubt other drawbacks are evident to those having frequent occasion to use such means for wrapping and carrying bouquets.

SUMMARY OF THE INVENTION

A prefabricated wrapper for a bouquet of flowers is provided, having a decorative crush-to-hold intermediate portion, e.g. made of metal foil, paper-backed metal foil or the like, such as florists use for decorative flower pot-wrapping material, and also having a drip-catching or water-holding lower portion and a flaring, preferably translucent upper portion, the three portions being serially connected together along respective adjoining pairs of borders or the intermediate portion overlayed onto the wrapping material.

The principles of the invention will be further discussed with reference to the drawing wherein a preferred embodiment is shown. The specifics illustrated in the drawing are intended to exemplify, rather than limit, aspects of the invention as defined in the claims.

DETAILED DESCRIPTION

Figure 1:
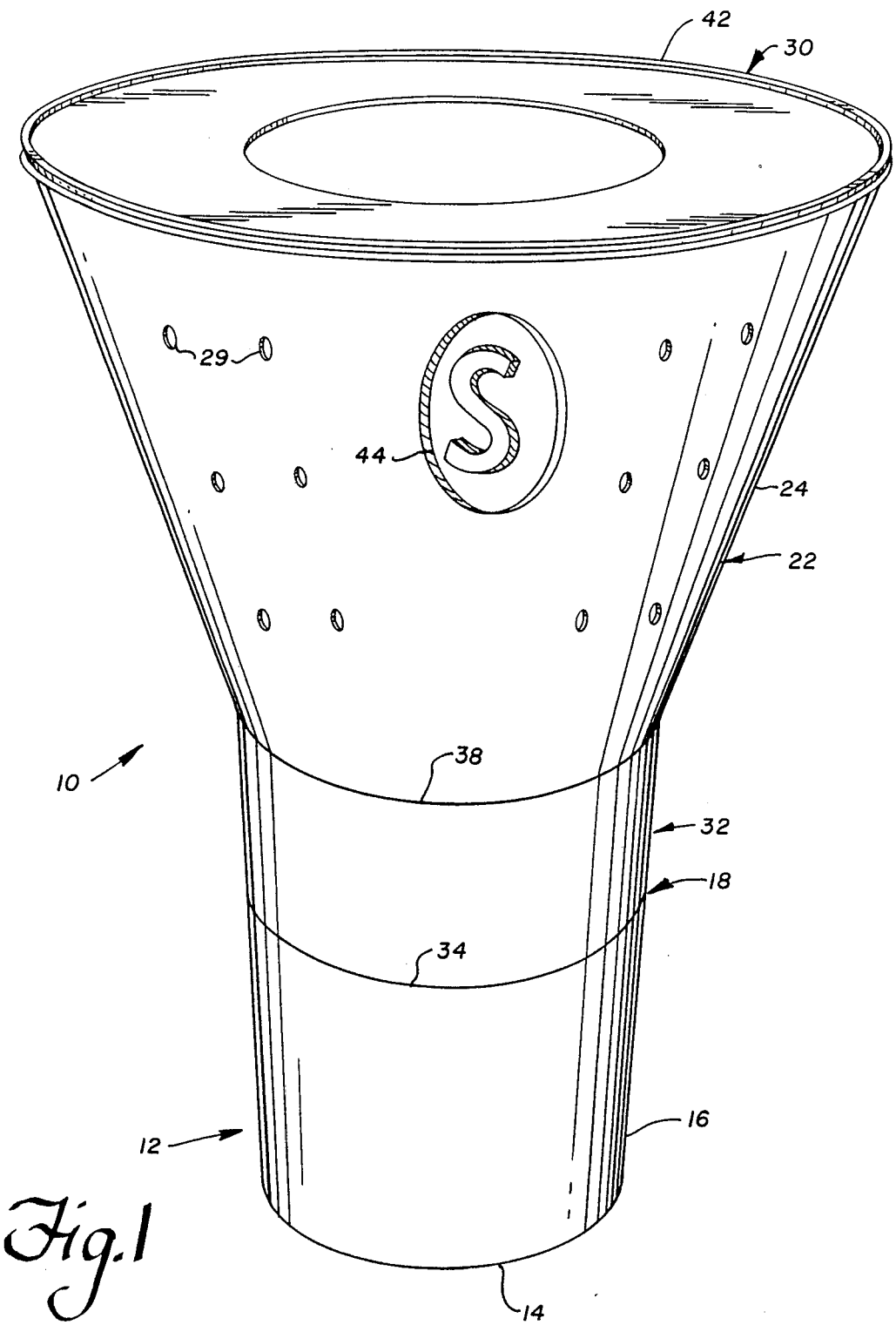
FIG. 1 is a perspective view of a bouquet sleeve embodying principles of the present invention.

The bouquet sleeve 10 of the present invention preferably includes a lower portion 12 in the form of an upwardly open, downwardly closed cup preferably made of water-resistant if not waterproof, foldable or collapsible material typified by polyethylene, polypropylene, polystyrene, polyvinylchloride and the like, e.g. in formed sheet or film form, in much the same way and using the same materials and techniques as the products normally found on the picnic supplies and plastic bag shelves at today's typical supermarket. The cup 12 has a bottom wall 14, and a peripheral sidewall 16 with an open upper end 18 having a circumferentially extending (i.e. a perimetrically extending) margin 20.

Figure 2:
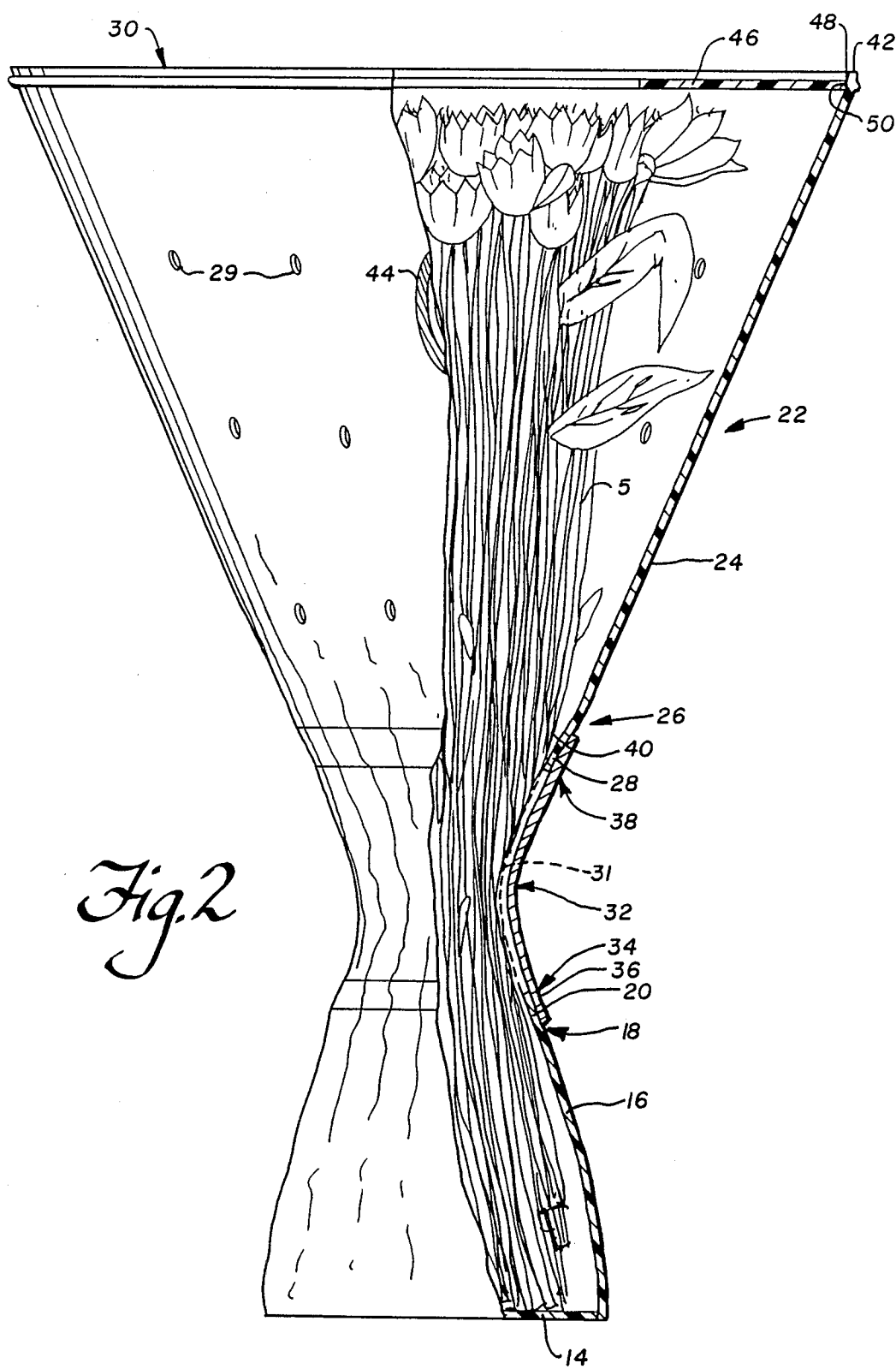
FIG. 2 is a side elevational view thereof, partially broken away and sectioned to expose interior details of the article in a condition of use.

The bouquet sleeve 10 of the present invention preferably further includes an upper portion 22 in the form of a cylindrical or frusto-conical tube, the sidewall 24 of which is downwardly open at a lower end 26 having a circumferentially extending (i.e. a perimetrically extending) margin 28. By preference, the sidewall 24 of the tube 22 also is upwardly open at an upper end 30. It is also preferable that portion 22 have holes or perforations 29 to allow the bouquet to breath. The portion 22 may be made of the same material as the lower portion 12, or of any similar or suitable material. Alternatively, portions 12 and 22 may be formed unitarily of the same material, as shown by the connecting portion of material 31 shown in phantom in FIG. 2. If the portion 22 is made wholly or partly of translucent or transparent material it may serve a visual display function for the flower heads of the contained bouquet.

Axially between and joining the upper and lower portions 22 and 12 is an intermediate portion 32 in the form of a tube, the sidewall of which is downwardly open at a lower end 34 having a circumferentially extending (i.e. a perimetrically extending) margin 36, and which is upwardly open at an upper end 38 having a circumferentially extending (i.e. a perimetrically extending) margin 40. If upper and lower portions are formed of unitary material, intermediate portion 32 is overlayed or laminated on the inside or outside of connecting portion 31.

In accordance with the principles of the invention the tube 32 is made of an easily manually plastically deformed, substantially or generally non-resilient, yet waterproof or water-resistant material such as aluminum foil, aluminum foil/paper laminate, plastic film/aluminum foil/paper laminate, or the like, suitable alternatives to which should suggest themselves to ones skilled in the art upon absorbing the disclosure of the present invention as provided herein.

The article 10 may be assembled in any convenient manner, e.g. by lap-joining the margin 20 with the margin 34 an the margin 40 with the margin 28 using a suitable water-resistant or waterproof adhesive such as is used for joining the bottoms to the sidewalls of disposable paper cups for hot beverages.

The lip 42 of the upper portion 22 at its upper end may be curled over, in much the same way as the lip of a disposable paper or plastic drinking cup is curled over. A logo 44 or other decorative and/or informative indicia or designs may be applied to any of the portions 12, 22, 32, e.g. by printing, embossing, stenciling or the like. This material may include a brand name, the names(s) of the flowers incorporated in the bouquet and/or a topical message, such as "Happy Valentine's Day".

In typical self-service use, a customer selects for purchase a bouquet of flowers BF having stems S and flower heads FH. These will likely have been kept, while awaiting purchase, with the lower ends of their stems in a container of water, so that as they are removed, some dampness and liquid droplets remain clinging to and perhaps dripping from the stems S. The customer selects a bouquet sleeve 10 from a supply of such sleeves made available near the display of bouquet of flowers. The customer then places this bouquet, wet stems down, in a bouquet sleeve 10, until the lower ends of the stems are disposed within or in the vicinity of the lower portion 12, and the flower heads are preferably disposed in, but may project up out of the upper portion 22, at which time some portions of substantial length of the stems S are disposed in the intermediate portion 32. With the bouquet protected in the sleeve, the customer may then select any other articles desired, and pay for them all at one time.

The upper portion 22 may include at or near its upper end a closure disk or an annular collar 46 which partially obstructs the opening at 30. The member 46 may be integrally formed with the upper portion 22, or it may be separately provided as a selectable, removably attachable accessory, for instance by having its outer perimetrical edge 48 seat in a corresponding radially inwardly opening groove 50 formed in the sidewall of the upper portion 22 near the end 30.

The purchaser then manually lightly squeezes the intermediate portion 32 from externally of the bouquet sleeve, using enough pressure to custom-crush the material of the portion 32 into intimate at least somewhat interlocking relation with the collection of flower stems S. Although the bouquet BF will tend to stay contained in and attached to the sleeve 10 because of the way that the band 32 has been crushed into the stems, intentional removal of the bouquet is rather easy. The person wishing to remove the bouquet simply reaches into the open end 30 with one hand and encircles the stems of the bouquet behind the flower heads and pulls lightly outwards while holding or pulling in the opposite direction on the sleeve 10. As a preliminary to or as an adjunct to this decontainerizing maneuver, the person may pull laterally outwards on any regions of the band 32 which seem to be especially deeply enmeshed in the collection of flower stems.

Although a preferred embodiment has been described, it should be apparent that many of the principles of the invention could be put to use on a product which is either more elaborate, e.g. by having some type of lid or covering for the upper end 30, or which is made less elaborate, e.g. by omission of all or part of either the lower portion 12 or the upper portion 22 and/or by making all or part of either of these portions out of the same material as the crushable band 32.

It should now be apparent that the bouquet sleeve as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A bouquet sleeve for removably containing a bouquet of cut flowers having flower heads on stems, said bouquet sleeve comprising:
    (a) a tubular band of sheet material having an upper end and a lower end, each end with a respective perimetrically-extending margin, this band being adapted to loosely encircle the stems of the bouquet below the flower heads and being adapted to be easily manually crushed into conforming engagement with the stems of the bouquet in order to releasably restrain mobility of the bouquet relative to said band;
    (b) an upwardly-open cup-shaped lower portion made of a moisture resistant material and having a perimetrically-extending upper region perimetrically joined with said perimetrically-extending lower end margin of said tubular band; and
    (c) a downwardly-open, upwardly flared tubular upper portion having a perimetrically-extending lower region perimetrically joined with said perimetrically-extending upper end margin of said tubular band,
said lower region of said upper portion and said upper region of said lower portion both provided as longitudinally adjoining regions of a common element which lies radially adjacent said tubular band,
said downwardly-open tubular portion having a perimetrically-extending upper end and, near said upper end, a radially inwardly-opening groove means; and
    (d) a closure disk removably attached to said downwardly-open tubular portion by being seated about an outer perimetrical edge thereof in said groove means.

* * * * *